(12) United States Patent
Salamandra et al.

(10) Patent No.: US 8,439,787 B2
(45) Date of Patent: May 14, 2013

(54) TRANSMISSION WITH MIXED PLANETARY LAYSHAFT STRUCTURE

(75) Inventors: Konstantin Borisovich Salamandra, Moscow (RU); Vadim Evgenievich Oreshkin, Moscow (RU); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 228 days.

(21) Appl. No.: 12/954,931

(22) Filed: Nov. 29, 2010

(65) Prior Publication Data

US 2011/0230298 A1 Sep. 22, 2011

(30) Foreign Application Priority Data

Mar. 19, 2010 (RU) ................................ 2010110530

(51) Int. Cl.
*F16H 3/08* (2006.01)
*F16H 37/02* (2006.01)

(52) U.S. Cl.
USPC ............. 475/207; 475/215; 475/218; 74/330; 74/331

(58) Field of Classification Search ........... 74/330, 74/331; 475/207, 214, 215, 218
See application file for complete search history.

(56) References Cited

U.S. PATENT DOCUMENTS

| | | | | |
|---|---|---|---|---|
| 3,589,483 A | * | 6/1971 | Smith | 192/3.52 |
| 4,070,927 A | | 1/1978 | Polak | |
| 4,709,594 A | | 12/1987 | Maeda | |
| 5,106,352 A | | 4/1992 | Lepelletier | |
| 5,385,064 A | | 1/1995 | Reece | |
| 5,497,867 A | | 3/1996 | Hirsch et al. | |
| 5,560,461 A | | 10/1996 | Loeffler | |

(Continued)

FOREIGN PATENT DOCUMENTS

| BY | 8590 C1 | 10/2006 |
|---|---|---|
| JP | 09-126283 A | 5/1997 |

(Continued)

OTHER PUBLICATIONS

Masami Kondo, Yoshio Hasegawa, Yoji Takanami, Kenji Arai, Masaharu Tanaka, Masafumi Kinoshita, Takeshi Ootsuki, Tetsuya Yamaguchi, Akira Fukatsu, "Toyota AA80E 8-Speed Automatic Transmission with Novel Powertrain Control System", SAE Technical Paper Series, Apr. 16-19, 2007, 2007-01-1311, Warrendale, PA 15096-0001 USA.

(Continued)

*Primary Examiner* — Tisha Lewis
(74) *Attorney, Agent, or Firm* — Quinn Law Group, PLLC

(57) ABSTRACT

A transmission includes an input member, an output member, a first and a second intermediate member, and a planetary gear set, all of which are coaxial and define a first axis of rotation. A first and a second layshaft are arranged to define a second axis of rotation and a third axis of rotation, respectively. Each of five sets of intermeshing gears transfer torque from a respective one of the intermediate members to a respective one of the layshafts via engagement of different respective ones of nine torque-transmitting mechanisms. A set of transfer gears transfers torque from the layshafts to the output member. One of the torque-transmitting mechanisms grounds a member of the planetary gear set to a stationary member. The nine torque-transmitting mechanisms are engagable in different combinations to establish up to eight forward speed ratios and at least one reverse speed ratio.

18 Claims, 1 Drawing Sheet

U.S. PATENT DOCUMENTS

| | | | |
|---|---|---|---|
| 5,599,251 | A | 2/1997 | Beim et al. |
| 5,641,045 | A | 6/1997 | Ogawa et al. |
| 5,651,435 | A | 7/1997 | Perosky et al. |
| 5,975,263 | A | 11/1999 | Forsyth |
| 6,053,839 | A | 4/2000 | Baldwin et al. |
| 6,071,208 | A | 6/2000 | Koivunen |
| 6,083,135 | A | 7/2000 | Baldwin et al. |
| 6,217,474 | B1 | 4/2001 | Ross et al. |
| 6,354,416 | B1 | 3/2002 | Eo |
| 6,375,592 | B1 | 4/2002 | Takahashi et al. |
| 6,422,969 | B1 | 7/2002 | Raghavan et al. |
| 6,425,841 | B1 | 7/2002 | Haka |
| 6,471,615 | B1 | 10/2002 | Naraki et al. |
| 6,558,287 | B2 | 5/2003 | Hayabuchi et al. |
| 6,623,397 | B1 | 9/2003 | Raghavan et al. |
| 6,840,885 | B2 | 1/2005 | Yi et al. |
| 6,958,028 | B2 * | 10/2005 | Janson et al. ............ 475/207 |
| 7,070,534 | B2 * | 7/2006 | Pelouch ............ 475/214 |
| 7,220,210 | B2 | 5/2007 | Soh |
| 7,311,630 | B2 * | 12/2007 | Borgerson ............ 475/215 |
| 7,604,561 | B2 * | 10/2009 | Earhart ............ 475/218 |
| 7,833,120 | B2 * | 11/2010 | Yang ............ 475/209 |
| 8,043,187 | B2 * | 10/2011 | Yang ............ 475/218 |
| 2006/0014603 | A1 | 1/2006 | Raghavan et al. |

FOREIGN PATENT DOCUMENTS

| | | |
|---|---|---|
| SU | 1204413 A1 | 1/1986 |
| WO | 03025431 A1 | 3/2003 |
| WO | 2006032312 A1 | 3/2006 |
| WO | 2006074707 A1 | 7/2006 |

OTHER PUBLICATIONS

Hirofumi Ota, Kazutoshi, Nozaki, Atsushi Honda, Masafumi Kinoshita, Toshihiko Aoki, Minoru Todo, Mikio Iwase, "Toyota's World First 8-Speed Automatic Transmission for Passenger Cars", SAE Technical Paper Series, Apr. 16-19, 2007, 2007-01-1101, Warrendale, PA 15096-0001 USA.

* cited by examiner

| Gear State | Speed Ratio | Ratio Step | C1 | C2 | C3 | C4 | C5 | C6 | C7 | C8 | C9 |
|---|---|---|---|---|---|---|---|---|---|---|---|
| REV1 | -2.3 |  |  | X |  | X |  |  |  |  | X |
| REV2 | -6.9 |  |  |  | X | X |  |  |  |  | X |
| 1st | 6.96 |  |  |  | X | X |  |  | X |  |  |
| 2nd | 5.25 | 1.32 |  |  | X |  | X | X |  |  |  |
| 3rd | 3.96 | 1.32 |  |  | X | X |  |  |  | X |  |
| 4th | 3.00 | 1.32 |  |  | X |  | X | X |  |  |  |
| 5th | 2.32 | 1.29 | X |  | X |  |  | X |  |  |  |
| 6th | 1.75 | 1.33 | X |  |  | X | X |  |  |  |  |
| 7th | 1.32 | 1.33 | X |  | X |  |  |  |  | X |  |
| 8th | 1.00 | 1.32 | X |  |  | X | X |  |  |  |  | x = Engaged State

TRANSMISSION WITH MIXED PLANETARY LAYSHAFT STRUCTURE

CROSS-REFERENCE TO RELATED APPLICATION

This application claims the benefit of Russian Patent Application No. 2010110530, filed Mar. 19, 2010, which is hereby incorporated by reference in its entirety.

TECHNICAL FIELD

The invention relates to a multi-speed planetary transmission with layshafts, sets of intermeshing gears, a planetary gear set, and multiple torque-transmitting mechanisms.

BACKGROUND OF THE INVENTION

Automotive vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising other than the most efficient point. Therefore, manually-shifted (layshaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improved the shift quality of the transmission by making the ratio interchanges substantially imperceptible to the operator under normal vehicle acceleration.

Multi-speed transmissions with greater than four speed ratios provide further improvements in acceleration and fuel economy over three- and four-speed transmissions. However, typical increased complexity, size and cost of such transmissions are competing factors which may prevent their use in some applications.

SUMMARY OF THE INVENTION

A multi-speed transmission is provided that utilizes a planetary gear set and torque transfer using sets of intermeshing gears and layshafts. The transmission includes an input member, an output member, a first intermediate member, and a second intermediate member. A stationary member, such as a transmission casing, is provided. The transmission further includes a planetary gear set. The input member, the output member, the intermediate members, and the simple planetary gear set are arranged coaxially with one another to define a first axis of rotation. A first and a second layshaft define a second axis of rotation and a third axis of rotation, respectively. Nine torque-transmitting mechanisms are provided. In one embodiment, eight of the torque-transmitting mechanisms are selectively engagable and one of the torque-transmitting mechanisms is a one-way clutch. Different ones of the torque-transmitting mechanisms may be friction clutches, synchronizers, band clutches, a selectively engagable one-way clutch, a dog clutch, or other types of clutches.

Five sets of intermeshing gears are each arranged to transfer torque from a respective one of the intermediate members to a respective one of the layshafts via engagement of different respective ones of the torque-transmitting mechanisms. Each set of intermeshing gears is axially spaced from the other sets of intermeshing gears. A set of transfer gears is arranged to transfer torque from the layshafts to the output member. The nine torque-transmitting mechanisms are engagable in different combinations to establish up to eight forward speed ratios and at least one reverse speed ratio between the input member and the output member.

As used herein, a "clutch" means a rotating-type clutch, or a stationary-type clutch, otherwise referred to as a brake. Different ones of the clutches may be friction clutches, synchronizers, band clutches, a selectively engagable one-way clutch, a dog clutch, or other types of clutches.

As used herein, "common rotation" means rotation at the same speed (i.e., no relative rotation). As used herein, the "gear ratio" is the ratio of the torque of the output member to the torque of the input member. A speed ratio corresponds with each gear ratio. The "speed ratio" is the ratio of the speed of the input member to the speed of the output member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
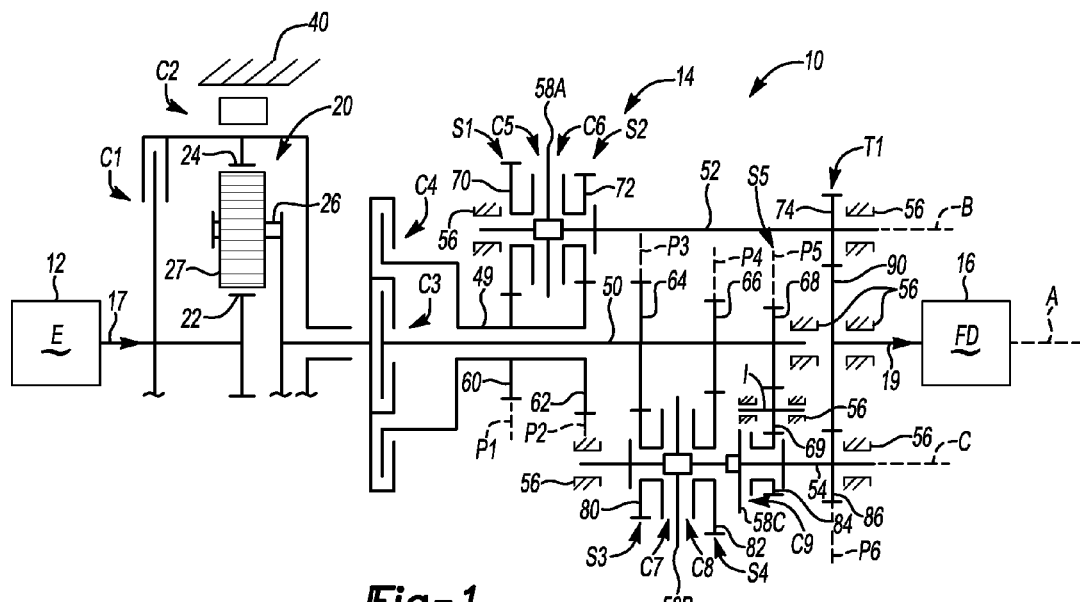
FIG. 1 is a schematic illustration in stick diagram form of a powertrain having a first embodiment of a multi-speed transmission.
FIG. 2 is a truth table depicting some of the operating characteristics of the transmission shown in FIG. 1.

Referring to the drawings, wherein like reference numbers refer to like components, FIG. 1 shows the powertrain 10 with an engine 12 (labeled E), a combination layshaft and planetary transmission 14, and a final drive mechanism 16 (labeled FD). The engine 12 may be powered by various types of fuel to improve the efficiency and fuel economy of a particular application. Such fuels may include, for example gasoline, diesel, an ethanol, dimethyl ether, etc. The transmission 14 includes an input member 17 continuously connected with an output member of the engine 12, such as a crankshaft, optionally through a torque converter. The transmission 14 further includes a planetary gear set 20, five sets of intermeshing gears S1, S2, S3, S4, S5, and a transfer gear set T1, described below. The transmission 14 has a first intermediate member 49, a second intermediate member 50, a first layshaft 52, a second layshaft 54, and an output member 19 connected with the final drive mechanism 16 for providing propulsion power to vehicle wheels. The intermediate members 49, 50 are concentric. First intermediate member 49 is a sleeve shaft that rotates concentrically about second intermediate member 50.

The planetary gear set 20 is a simple planetary gear set in this embodiment, and includes a sun gear member 22, a ring gear member 24, and a carrier member 26 that rotatably supports a set of pinion gears 27. The pinion gears 27 mesh with sun gear member 22 and ring gear member 24. The sun gear member 22 is referred to as the first member of the planetary gear set 20 and is continuously connected for rotation with the input member 17. The ring gear member 24 is referred to as the second member of the planetary gear set 20. The carrier member 26 is referred to as the third member of the planetary gear set 20.

The transmission 14 includes multiple shafts arranged to define three different axes of rotation A, B, and C. The input member 17, the output member 19, the intermediate members 49, 50 and the planetary gear set 20 are coaxial and define a first axis of rotation A. A first layshaft 52 and a second layshaft 54 are spaced parallel to the first axis of rotation A, and define a second axis of rotation B, and a third axis of rotation C, respectively.

A first set S1 of intermeshing gears includes gears 60, and 70, which mesh in a first gear plane P1. Gear 60 is rigidly connected for common rotation with first intermediate member 49. Gear 70 meshes with gear 60, and rotates concentrically about layshaft 52. The input member 17, layshafts 52 and 54, intermediate members 49, 50, and output member 19 are supported for rotation by grounded bearings 56, some of which are shown.

A second set S2 of intermeshing gears includes gears 62 and 72, which mesh in a second gear plane P2. Gear 62 is rigidly connected for common rotation with first intermediate member 49. Gear 72 meshes with gear 62, and rotates concentrically about layshaft 52.

A third set S3 of intermeshing gears includes gears 64 and 80 which mesh in a third gear plane P3. Gear 64 is rigidly connected for common rotation with second intermediate member 50. Gear 80 meshes with gear 64 and rotates concentrically about layshaft 54.

A fourth set S4 of intermeshing gears includes gears 66 and 82, which mesh in a fourth gear plane P4. Gear 66 is rigidly connected for common rotation with second intermediate member 50. Gear 82 rotates concentrically about layshaft 54 and meshes with gear 66.

A fifth set S5 of intermeshing gears includes gears 68, 69 and 84, which mesh in a fifth gear plan P5. Gear 68 is rigidly connected for common rotation with second intermediate member 50. Gear 69 is connected for rotation with an idler shaft I and meshes with gear 68 and gear 84. Gear 84 rotates concentrically about layshaft 54.

A set T1 of transfer gears includes gears 74, 90 and 86, which mesh in a sixth gear plane P6. Gear 74 is rigidly connected for common rotation with layshaft 52. Gear 90 is rigidly connected for common rotation with output member 19 and meshes with gear 74 and with gear 86. Gear 86 is rigidly connected for rotation with layshaft 54. The gear planes P1-P6 extend perpendicular to the drawing sheet in FIG. 1.

The transmission 14 further includes nine torque-transmitting mechanisms: a first torque-transmitting mechanism C1, a second torque-transmitting mechanism C2, a third torque-transmitting mechanism C3, a fourth torque-transmitting mechanism C4, a fifth torque-transmitting mechanism C5, a sixth torque-transmitting mechanism C6, a seventh torque-transmitting mechanism C7, an eighth torque-transmitting mechanism C8, and a ninth torque-transmitting mechanism C9. Torque-transmitting mechanism C2 is a one-way clutch that does not engage when the ring gear member 24 rotates in the same direction as the input member 17, but engages to ground the ring gear member 24 to the stationary member 40 when torque is applied to the ring gear member 24 in the opposite direction of rotation than the input member 17. The torque-transmitting mechanisms C1, C3, C4, C5, C6, C7, C8 and C9 are selectively engagable rotating-type clutches. Torque-transmitting mechanisms C1, C3 and C4 are preferably friction-type clutches, while torque-transmitting mechanisms C5, C6, C7, C8 and C9 are synchronizers. In other embodiments, the torque-transmitting mechanisms may be still different types of clutches.

Torque-transmitting mechanism C1 is selectively engagable to connect input member 17 for common rotation with ring gear member 24. Torque-transmitting mechanism C3 is selectively engagable to connect carrier member 26 for common rotation with second intermediate member 50 and gears 64, 66 and 68. Torque-transmitting mechanism C4 is selectively engagable to connect carrier member 26 for common rotation with first intermediate member 49 and gears 60 and 62.

The torque-transmitting mechanisms C5 and C6 that are concentric with layshaft 52 are integrated as a double-sided synchronizer actuated by a shift fork 58A. If shift fork 58A is shifted toward gear 70, clutch C5 engages so that gear 70 is connected for rotation with layshaft 52. If shift fork 58A is shifted toward gear 72, clutch C6 engages so that gear 72 is connected for rotation with layshaft 52. Torque-transmitting mechanisms C7 and C8 that are concentric with layshaft 54 are integrated as a double-sided synchronizer actuated by a shift fork 58B. If shift fork 58B is shifted toward gear 80, clutch C7 engages so that gear 80 is connected for rotation with layshaft 54. If shift fork 58B is shifted toward gear C8, clutch C8 engages so that gear C8 is connected for rotation with layshaft 54. Torque-transmitting mechanism C9 is a single-sided synchronizer concentric with layshaft 54. If shift fork 58C is shifted toward gear 84, clutch C9 engages so that gear 84 is connected for rotation with layshaft 54.

Additionally, if only clutches C1, C3 and C4 are friction-type clutches, then, according to the engagement chart of FIG. 2, discussed below, there would only be one or two open clutches in each speed ratio, limiting spin losses. Alternatively, torque-transmitting mechanisms C5, C6, C7, C8 and C9 may also be friction clutches, or torque-transmitting mechanisms C1, C3, and C4 may be synchronizers. The use of synchronizers in lieu of clutches reduces spin losses. In other embodiments, the torque-transmitting mechanisms may be still different types of clutches.

As shown in the truth table of FIG. 2, the torque-transmitting mechanisms C1, C2, C3, C4, C5, C6, C7, C8, and C9 are selectively engagable in combinations of three to provide up to eight forward speed ratios and two reverse speed ratios (listed as gear states). Numerical gear ratios corresponding with the speed ratios are listed in FIG. 2. The gear ratio is the ratio of the torque of the output member 19 to the torque of the input member 17.

The numerical gear ratios set forth in FIG. 2 result from the tooth counts establishing the following gear ratios. The gear ratio of the ring gear member 24 to the sun gear member 22 is −2.0, assuming carrier member 26 is stopped (for purposes of calculation only). The gear ratio of the gear 70 to gear 60 is −1.0. The gear ratio of gear 72 to gear 62 is −1.75. The gear ratio of gear 80 to gear 64 is −2.32. The gear ratio of gear 82 to gear 66 is −1.32. The gear ratio of gear 84 to gear 68 is 2.3. The gear ratio of gear 56 and of gear 86 to gear 90 is 4.0. With the ratios of the gears listed above, there are seven underdrive speed ratios (1st to 7th), and a direct drive speed ratio (8th) that result in the ratio steps listed in FIG. 2. As is apparent in FIG. 2, the ratio steps are relatively even in the forward speed ratios, resulting in smooth shift feel and increased fuel efficiency as the engine 12 need only operate over a narrow range of speeds in each speed ratio. Other gear tooth counts and corresponding gear ratios may be selected to accomplish speed ratios and ratio steps advantageous to the particular transmission application. A person of ordinary skill in the art of transmission design would understand how to select desirable tooth counts.

To establish the reverse speed ratio (REV1), clutches C1, C3, and C9 are engaged. Because clutch C1 is engaged, torque is transferred from the input member 17 to ring gear member 24, and through planetary gear set 20 to the second intermediate 50 via engaged clutch C3. Torque is transferred from second intermediate member 50 to layshaft 54 through intermeshing gears 68, 69, 84 via engaged clutch C9, and through intermeshing gears 86, 90 to output member 19. The output member 19 rotates in an opposite direction than the input member 17.

To establish the reverse speed ratio (REV2), clutches C2, C3, and C9 are engaged. Clutch C2 automatically engages as torque is transferred from the input member 17 to sun gear member 22, through planetary gear set 20 to ring gear member 24, urging ring gear member 24 in an opposite direction than the input member 17 and causing clutch C2 to ground ring gear member 24 to the stationary member 40. Torque flows from carrier member 26 to the second intermediate 50 via engaged clutch C3. Torque is transferred from second intermediate member 50 to layshaft 54 through intermeshing gears 68, 69, 84 via engaged clutch C9, and through intermeshing gears 86, 90 to output member 19. The output member 19 rotates in an opposite direction than the input member 17.

To establish the first speed ratio (1st), clutches C2, C3 and C7 are engaged. Clutch C2 automatically engages as torque is transferred from the input member 17 to sun gear member 22, through planetary gear set 20 to ring gear member 24, urging ring gear member 24 in an opposite direction than the input member 17 and causing clutch C2 to ground ring gear member 24 to the stationary member 40. Torque flows from carrier member 26 to the second intermediate member 50 via engaged clutch C3. Torque is transferred from second intermediate member 50 to layshaft 54 through intermeshing gears 64, 80 via engaged clutch C7, and through intermeshing gears 86, 90 to output member 19. Input member 17 and output member 19 rotate in the same direction, as in all of the forward speed ratios.

To establish the second speed ratio (2nd), clutches C2, C4 and C6 are engaged. Clutch C2 automatically engages as torque is transferred from the input member 17 to sun gear member 22, through planetary gear set 20 to ring gear member 24, urging ring gear member 24 in an opposite direction than the input member 17 and causing clutch C2 to ground ring gear member 24 to the stationary member 40. Torque flows from carrier member 26 to the first intermediate member 49 via engaged clutch C4. Torque is transferred from first intermediate member 49 to layshaft 52 through intermeshing gears 62, 72 via engaged clutch C6, and through intermeshing gears 74, 90 to output member 19. The shift from the first speed ratio to the second speed ratio is a double-transition shift.

To establish the third speed ratio (3rd), clutches C2, C3 and C8 are engaged. Clutch C2 automatically engages as torque is transferred from the input member 17 to sun gear member 22, through planetary gear set 20 to ring gear member 24, urging ring gear member 24 in an opposite direction than the input member 17 and causing clutch C2 to ground ring gear member 24 to the stationary member 40. Torque flows from carrier member 26 to the second intermediate member 50 via engaged clutch C3. Torque is transferred from second intermediate member 50 to layshaft 54 through intermeshing gears 66, 82 via engaged clutch C8, and through intermeshing gears 86, 90 to output member 19. The shift from the second speed ratio to the third speed ratio is a double-transition shift.

To establish the fourth speed ratio (4th), clutches C2, C4 and C5 are engaged. Clutch C2 automatically engages as torque is transferred from the input member 17 to sun gear member 22, through planetary gear set 20 to ring gear member 24, urging ring gear member 24 in an opposite direction than the input member 17 and causing clutch C2 to ground ring gear member 24 to the stationary member 40. Torque flows from carrier member 26 to the first intermediate member 49 via engaged clutch C4. Torque is transferred from first intermediate member 49 to layshaft 52 through intermeshing gears 60, 70 via engaged clutch C5, and through intermeshing gears 74, 90 to output member 19. The shift from the third speed ratio to the fourth speed ratio is a double-transition shift.

To establish the fifth speed ratio (5th), clutches C1, C3 and C7 are engaged. Because clutch C1 is engaged, torque is transferred from the input member 17 to ring gear member 24, and through planetary gear set 20 to carrier member 26 and to the second intermediate 50 via engaged clutch C3. Torque is transferred from second intermediate member 50 to layshaft 54 through intermeshing gears 64, 80 via engaged clutch C7, and through intermeshing gears 86, 90 to output member 19. The shift from the fifth speed ratio to the sixth speed ratio is a double-transition shift.

To establish the sixth speed ratio (6th), clutches C1, C4 and C6 are engaged. Because clutch C1 is engaged, torque is transferred from the input member 17 to ring gear member 24, and through planetary gear set 20 to carrier member 26 and to the first intermediate 49 via engaged clutch C4. Torque is transferred from first intermediate member 49 to layshaft 52 through intermeshing gears 62, 72 via engaged clutch C6, and through intermeshing gears 74, 90 to output member 19. The shift from the fifth speed ratio to the sixth speed ratio is a single-transition shift.

To establish the seventh speed ratio (7th), clutches C1, C3 and C8 are engaged. Because clutch C1 is engaged, torque is transferred from the input member 17 to ring gear member 24, and through planetary gear set 20 to carrier member 26 and to the second intermediate member 50 via engaged clutch C3. Torque is transferred from second intermediate member 50 to layshaft 54 through intermeshing gears 66, 82 via engaged clutch C8, and through intermeshing gears 86, 90 to output member 19. The shift from the sixth speed ratio to the seventh speed ratio is a single-transition shift.

To establish the eighth speed ratio (8th), clutches C1, C4 and C5 are engaged. Because clutch C1 is engaged, torque is transferred from the input member 17 to ring gear member 24, and through planetary gear set 20 to carrier member 26 and to the first intermediate member 49 via engaged clutch C4. Torque is transferred from first intermediate member 49 to layshaft 52 through intermeshing gears 60, 70 via engaged clutch C5, and through intermeshing gears 74, 90 to output member 19. The shift from the seventh speed ratio to the eighth speed ratio is a double-transition shift.

Although eight forward speed ratios are available, the transmission 14 may be controlled to operate with only some of the available forward speed ratios. For example, the transmission 14 may be configured to operate as a six-speed transmission or a seven-speed transmission. The transmission 14 could also be operated with less than six forward speed ratios.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input member;
   an output member;
   a stationary member;
   a first intermediate member and a second intermediate member;
   a planetary gear set having a first member, a second member and a third member;
   wherein the first member is connected for common rotation with the input member;
   wherein the input member, the output member, the intermediate members, and the planetary gear set are arranged coaxially with one another to define a first axis of rotation;
   a first and a second layshaft defining a second axis of rotation and a third axis of rotation, respectively;
   nine torque-transmitting mechanisms;
   five sets of intermeshing gears each arranged to transfer torque from a respective one of the intermediate members to a respective one of the layshafts via engagement of different respective ones of the torque-transmitting mechanisms, each set of intermeshing gears being axially spaced from the other sets of intermeshing gears;
   a set of transfer gears arranged to transfer torque from the layshafts to the output member;
   wherein the nine torque-transmitting mechanisms are engagable in different combinations to establish up to eight forward speed ratios and at least one reverse speed ratio between the input member and the output member;
   wherein the nine torque-transmitting mechanisms include a first torque-transmitting mechanism that is selectively engagable to connect the input member for common rotation with the second member of the planetary gear set, and a second torque transmitting mechanism engagable to connect the second member of the planetary gear set to the stationary member; and
   wherein one of the first and the second torque-transmitting mechanisms is engaged in each of the forward speed ratios.

2. The multi-speed transmission of claim 1, wherein the second torque-transmitting mechanism is a one-way clutch.

3. The multi-speed transmission of claim 1, wherein the nine torque-transmitting mechanisms include a third torque-transmitting mechanism selectively engagable to connect the third member of the planetary gear set for common rotation with the second intermediate member, and a fourth torque-transmitting mechanism selectively engagable to connect the third member of the planetary gear set for common rotation with the first intermediate member.

4. The multi-speed transmission of claim 1, wherein the nine torque-transmitting mechanisms include a one-way clutch, three friction clutches, and five synchronizers.

5. The multi-speed transmission of claim 4, wherein two of the synchronizers are integrated as a first double synchronizer and another two of the synchronizers are integrated as a second double synchronizer.

6. The multi-speed transmission of claim 4, wherein the nine torque-transmitting mechanisms are engagable in different combinations of three to establish the eight forward speed ratios and the at least one reverse speed ratio between the input member and the output member; and wherein at least one of the friction clutches is engaged in each of the forward speed ratios and the at least one reverse speed ratio.

7. The multi-speed transmission of claim 1, wherein the nine torque-transmitting mechanisms are engagable to establish two reverse speed ratios between the input member and the output member.

8. The multi-speed transmission of claim 1, wherein each of the five sets of intermeshing gears includes a respective gear connected for common rotation with a respective one of the intermediate members, and a respective gear rotatable about a respective one of the layshafts; wherein a respective one of the torque-transmitting mechanisms is selectively engagable to connect the respective one of the gears rotatable about the respective one of layshafts for common rotation with the respective one of the layshafts.

9. The multi-speed transmission of claim 1, wherein the set of transfer gears includes a first gear connected for common rotation with the first layshaft, a second gear connected for common rotation with the second layshaft, and a third gear connected for common rotation with the output member and meshing with the first gear and the second gear.

10. The multi-speed transmission of claim 1, wherein the first member of the planetary gear set is a sun gear member, the second member of the planetary gear set is a ring gear member, and the third member of the planetary gear set is a carrier member that rotatably supports a set of pinion gears that mesh with both the ring gear member and the sun gear member; wherein the second torque transmitting mechanism is engaged to connect the second member of the planetary gear set to the stationary member when the second member rotates in a first direction; and wherein the second torque-transmitting mechanism is not engaged and does not ground the second member of the planetary gear set to the stationary member when the second member rotates in a second direction.

11. The multi-speed transmission of claim 1, wherein the first intermediate member and the second intermediate member are concentric.

12. A multi-speed transmission comprising:
    an input member;
    an output member;
    a stationary member;
    a first and a second intermediate member;
    a planetary gear set having a first member, a second member, and a third member;
    wherein the first member is connected for common rotation with the input member;
    a first and a second layshaft;
    a set of transfer gears having a first gear connected for common rotation with the first layshaft, a second gear connected for common rotation with the second layshaft, and a third gear connected for common rotation with output member and meshing with the first gear and the second gear;

wherein the input member, the output member, the intermediate members, and the planetary gear set are arranged coaxially with one another to define a first axis of rotation;

wherein the first and the second layshaft define a second axis of rotation and a third axis of rotation, respectively;

eight selectively engagable torque-transmitting mechanisms including three friction clutches, two double-sided synchronizers, and a single-sided synchronizer; wherein a first of the three friction clutches is selectively engagable to connect the input member for common rotation with the second member of the planetary gear set; wherein a second and a third of the three friction clutches are selectively engagable to connect the third member of the planetary gear set for common rotation with the first intermediate member and the second intermediate member, respectively;

a one-way clutch engagable to connect the second member of the planetary gear set to the stationary member;

five sets of intermeshing gears including:
a first set and a second set arranged to transfer torque from the first intermediate member to the first layshaft via engagement of a first of the double-sided synchronizers in alternate directions,
a third set and a fourth set arranged to transfer torque from the second intermediate member to the second layshaft via engagement of a second of the double-sided synchronizers in the alternate directions, and
a fifth set arranged to transfer torque from the second intermediate member to the second layshaft via engagement of the single-sided synchronizer; and wherein the eight selectively engagable torque-transmitting mechanisms and the one-way clutch are engagable in combinations of three to establish up to eight forward speed ratios and at least one reverse speed ratio between the input member and the output member.

13. The multi-speed transmission of claim 12, wherein at least one of the friction clutches is engaged in each of the speed ratios.

14. The multi-speed transmission of claim 13, wherein either the one-way clutch and one of the friction clutches or two of the friction clutches are engaged in each of the speed ratios.

15. A multi-speed transmission comprising:
an input member;
an output member;
a stationary member;
a first and a second intermediate member;
a first and a second layshaft;
a planetary gear set having a sun gear member, a ring gear member, and a carrier member rotatably supporting a set of pinion gears that mesh with both the sun gear member and the ring gear member; wherein the sun gear member is connected for common rotation with the input member;
a set of transfer gears having a first gear connected for common rotation with the first layshaft, a second gear connected for common rotation with the second layshaft, and a third gear connected for common rotation with the output member and meshing with first gear and the second gear;

wherein the input member, the output member, the intermediate members, and the planetary gear set are arranged coaxially with one another to define a first axis of rotation;

wherein the first and the second layshaft define a second axis of rotation and a third axis of rotation, respectively;

eight selectively engagable torque-transmitting mechanisms including three friction clutches, two double-sided synchronizers, and a single-sided synchronizer; wherein a first of the three friction clutches is selectively engagable to connect the input member for common rotation with the ring gear member; wherein a second of the friction clutches is selectively engagable to connect the carrier member of the planetary gear set for common rotation with the first intermediate member; wherein a third of the friction clutches is selectively engagable to connect the carrier member of the planetary gear set for common rotation with the second intermediate member;

a one-way clutch engagable to connect the ring gear member to the stationary member;

five sets of intermeshing gears, a first and a second of which are arranged to transfer torque from the first intermediate member to the first layshaft via engagement of a first of the double-sided synchronizers in alternate directions, a third and a fourth of which are arranged to transfer torque from the second intermediate member to the second layshaft via engagement of a second of the double-sided synchronizers in alternate directions, and a fifth of which is arranged to transfer torque from the second intermediate member to the second layshaft via engagement of the single-sided synchronizer;

wherein the eight selectively engagable torque-transmitting mechanisms and the one-way clutch are engagable in combinations of three to establish eight forward speed ratios and two reverse speed ratios between the input member and the output member; and wherein at least one of the friction clutches is engaged in each of the forward speed ratios and the two reverse speed ratios.

16. The multi-speed transmission of claim 1, wherein the nine torque-transmitting mechanisms are engaged in different combinations of three to establish said up to eight forward speed ratios and said at least one reverse speed ratio between the input member and the output member.

17. The multi-speed transmission of claim 1, wherein the nine torque-transmitting mechanisms include three friction clutches, two double-sided synchronizers, a single sided synchronizer, and a one-way clutch.

18. A multi-speed transmission comprising:
an input member;
an output member;
a stationary member;
a first intermediate member and a second intermediate member;
a planetary gear set having a first member, a second member and a third member;
wherein the first member is connected for common rotation with the input member;
wherein the input member, the output member, the intermediate members, and the planetary gear set are arranged coaxially with one another to define a first axis of rotation;
a first and a second layshaft defining a second axis of rotation and a third axis of rotation, respectively;
nine torque-transmitting mechanisms;
five sets of intermeshing gears each arranged to transfer torque from a respective one of the intermediate members to a respective one of the layshafts via engagement of different respective ones of the torque-transmitting mechanisms, each set of intermeshing gears being axially spaced from the other sets of intermeshing gears;

a set of transfer gears arranged to transfer torque from the layshafts to the output member;

wherein the nine torque-transmitting mechanisms are engagable in different combinations to establish up to eight forward speed ratios and at least one reverse speed ratio between the input member and the output member;

wherein each of the five sets of intermeshing gears includes a respective gear connected for common rotation with a respective one of the intermediate members, and a respective gear rotatable about a respective one of the layshafts; and wherein a respective one of the torque-transmitting mechanisms is selectively engagable to connect the respective one of the gears rotatable about the respective one of layshafts for common rotation with the respective one of the layshafts.

* * * * *